United States Patent
Shou-Mao (10) Patent No.: US 6,209,179 B1
(45) Date of Patent: Apr. 3, 2001

(54) CLASPING DEVICE

(76) Inventor: Chen Shou-Mao, 344, Section 1, Chung Shan Road Ta Cha Township, Taichung Hsien (TW)

( * ) Notice: Subject to any disclaimer, the term of this patent is extended or adjusted under 35 U.S.C. 154(b) by 0 days.

(21) Appl. No.: 09/397,316

(22) Filed: Sep. 16, 1999

(51) Int. Cl.⁷ .................................................. F16B 45/02
(52) U.S. Cl. ........................ 24/598.4; 24/600.1; 190/102
(58) Field of Search .................. 24/609, 599.1, 24/599.5, 598.1, 599.9, 601.1, 602, 601.5, 600.1, 600.2, 598.4; 248/309.1; 294/82.19, 82.33, 82.2, 82.34; D8/367; 190/102, 108

(56) References Cited

U.S. PATENT DOCUMENTS

| | | | |
|---|---|---|---|
| 3,850,468 | * | 11/1974 | Hultin . |
| 3,877,116 | * | 4/1975 | Holmberg . |
| 3,920,265 | * | 11/1975 | Nilsson . |
| 3,930,290 | * | 1/1976 | Mangels . |
| 4,279,062 | * | 7/1981 | Boissonnet . |
| 4,590,882 | * | 5/1986 | Murphy . |
| 5,593,009 | * | 1/1997 | King . |
| 5,634,246 | * | 6/1997 | Jermyn, Jr. . |
| 5,769,475 | * | 6/1998 | Tylaska . |
| 5,842,673 | * | 12/1998 | Fenton . |

\* cited by examiner

Primary Examiner—James R. Brittain
(74) Attorney, Agent, or Firm—Harrison & Egbert (57) ABSTRACT

A clasping device is formed of a hook plate, a control bolt, a retaining plate, a reinforcing hook, a cover, and a recovery spring. The hook plate is provided with a retaining seat having a retaining slot and a cross through hole in which the control bolt is received. The hook plate is provided in the back thereof with a receiving slot in which the retaining plate is received. The retaining plate has a hooked body which is received in the retaining slot to locate the crown portion of the recovery spring of a U-shaped construction. The receiving slot of the hook plate is sealed off by the cover which presses against the reinforcing hook which is located in the back of the hook plate.

1 Claim, 8 Drawing Sheets

CLASPING DEVICE

FIELD OF THE INVENTION

The present invention relates generally to a fastening device, and more particularly to a clasping device.

BACKGROUND OF THE INVENTION

Figure 1:
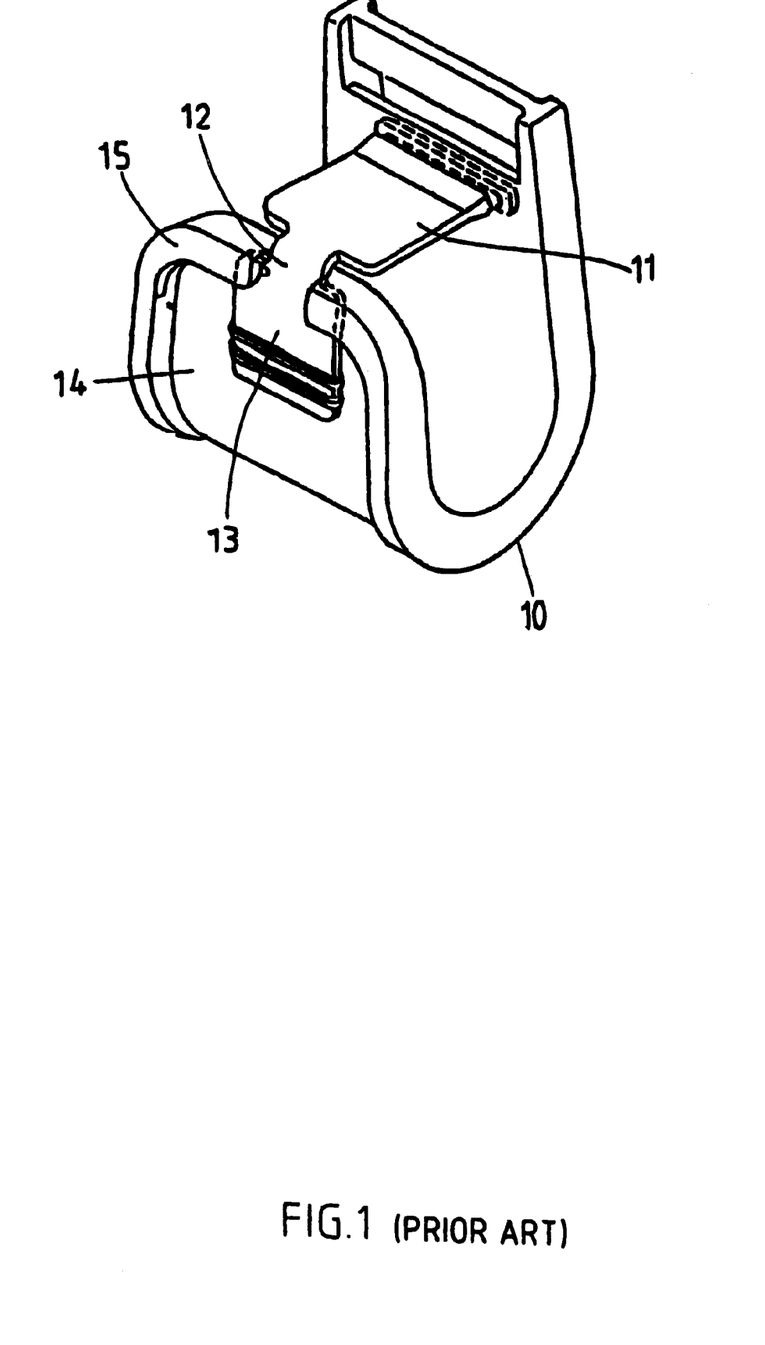
FIG. 1 shows a perspective view of a clasping device of the prior art.
Figure 2:
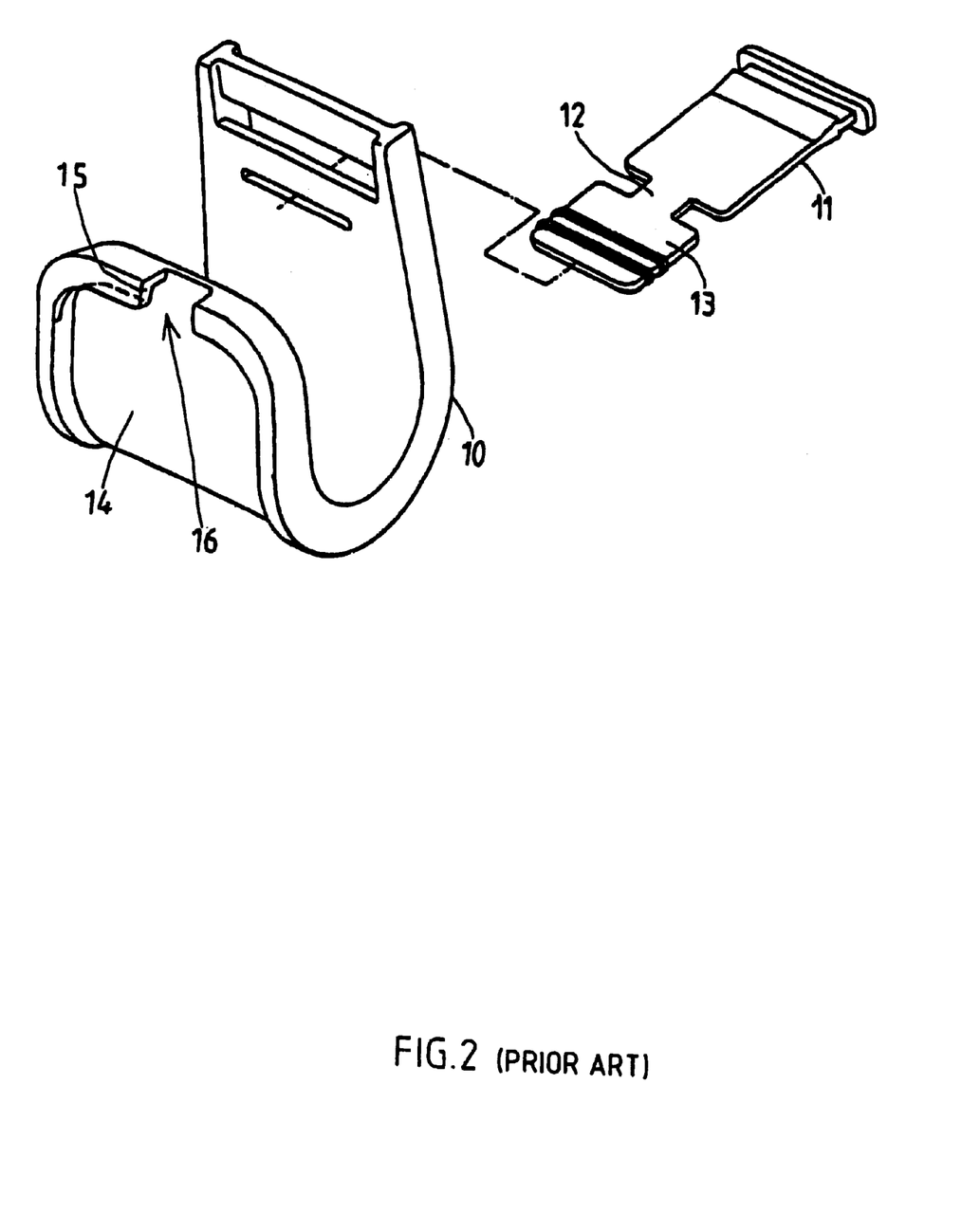
FIG. 2 shows an exploded view of the clasping device of the prior art.
Figure 3:
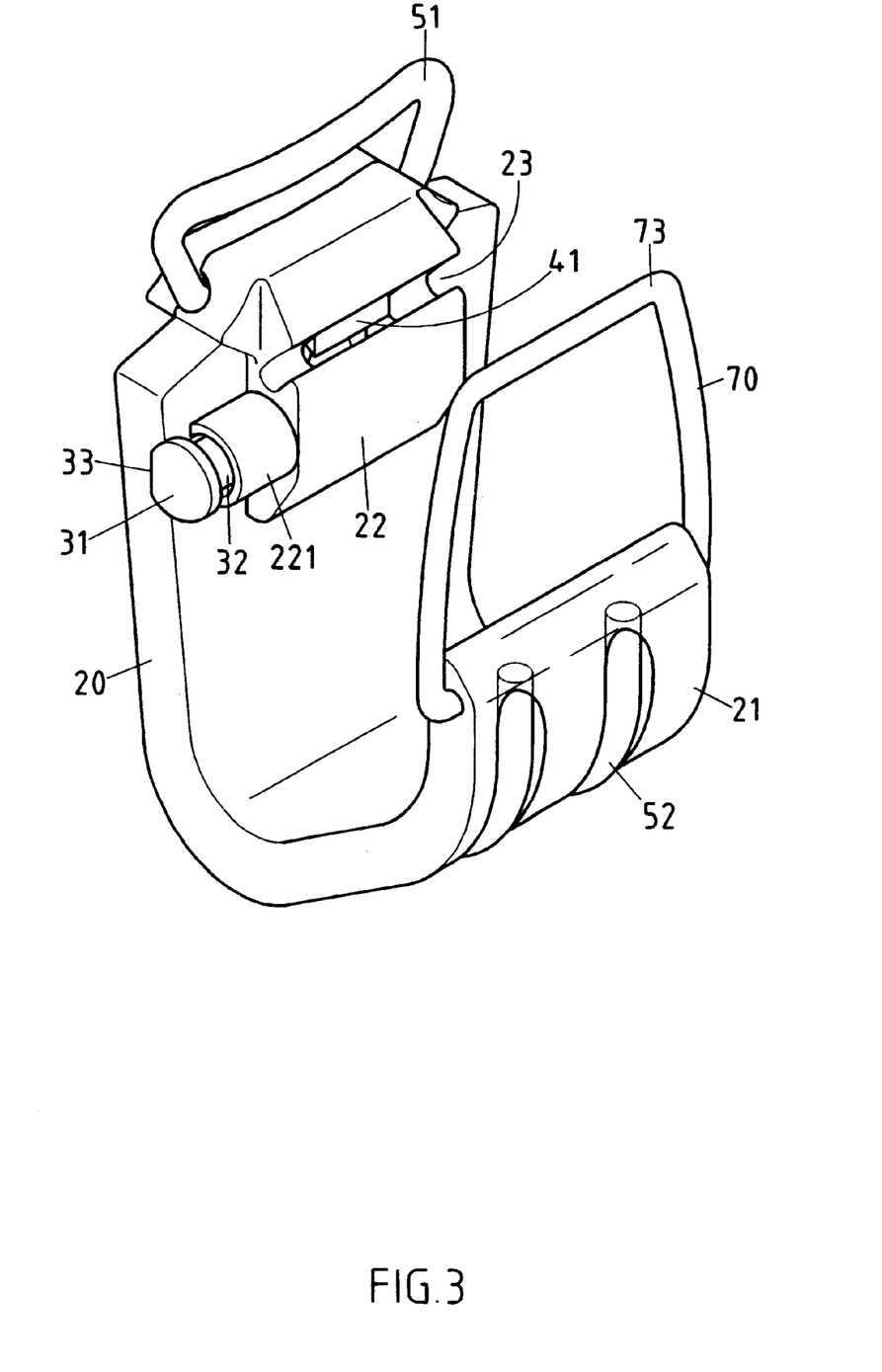
FIG. 3 shows a perspective view of the present invention.
Figure 4:
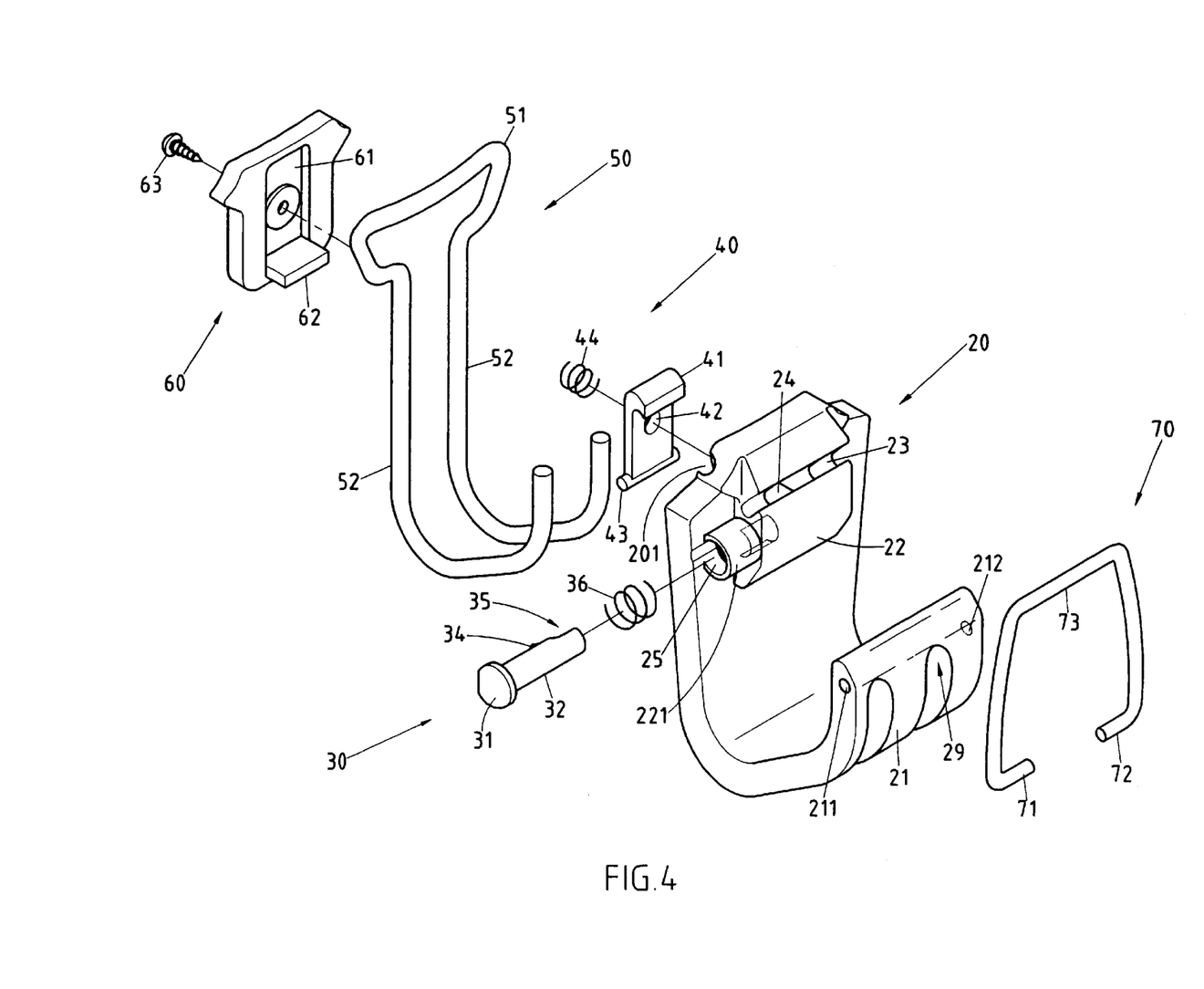
FIG. 4 shows an exploded view of the present invention.
Figure 5:
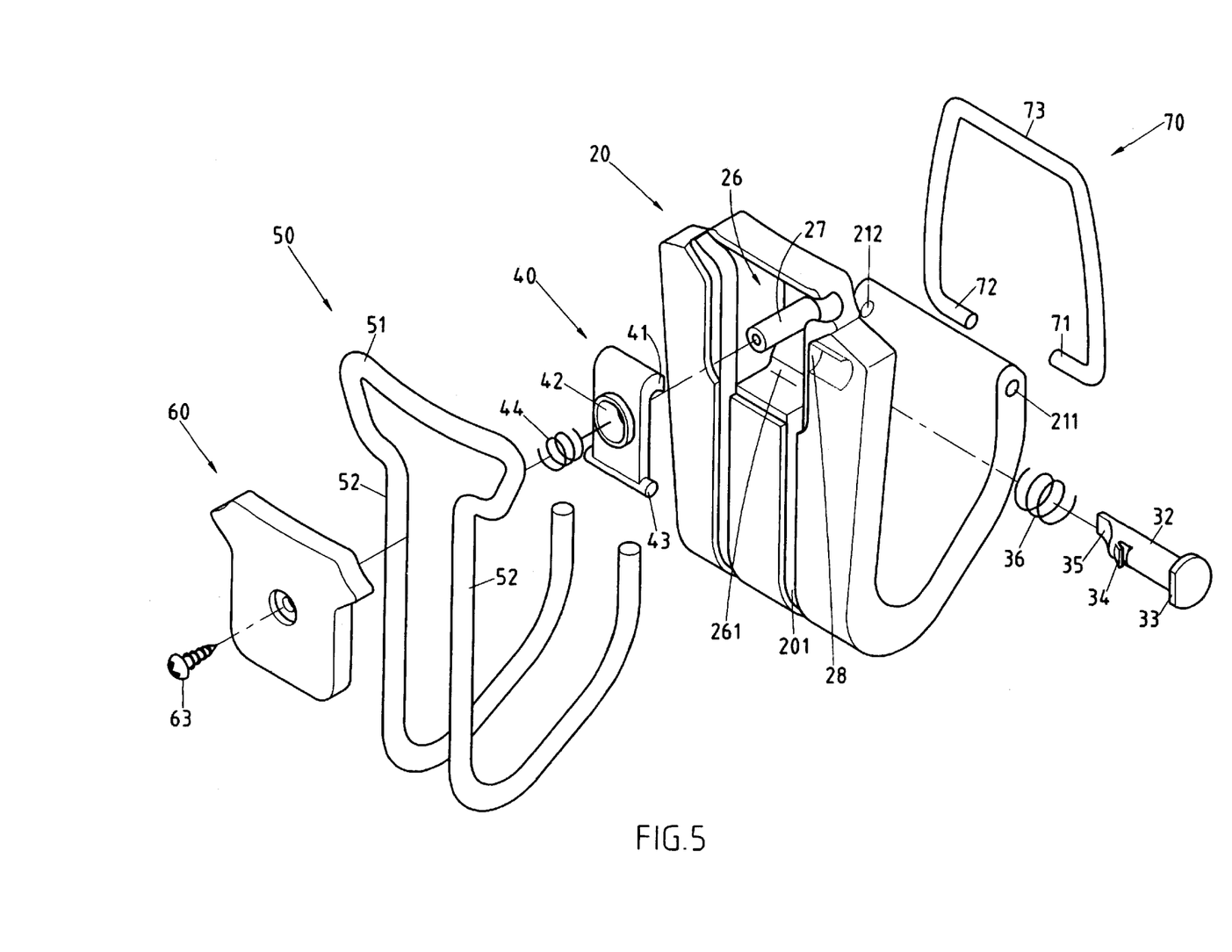
FIG. 5 shown an another exploded view of the present invention.
Figure 6:
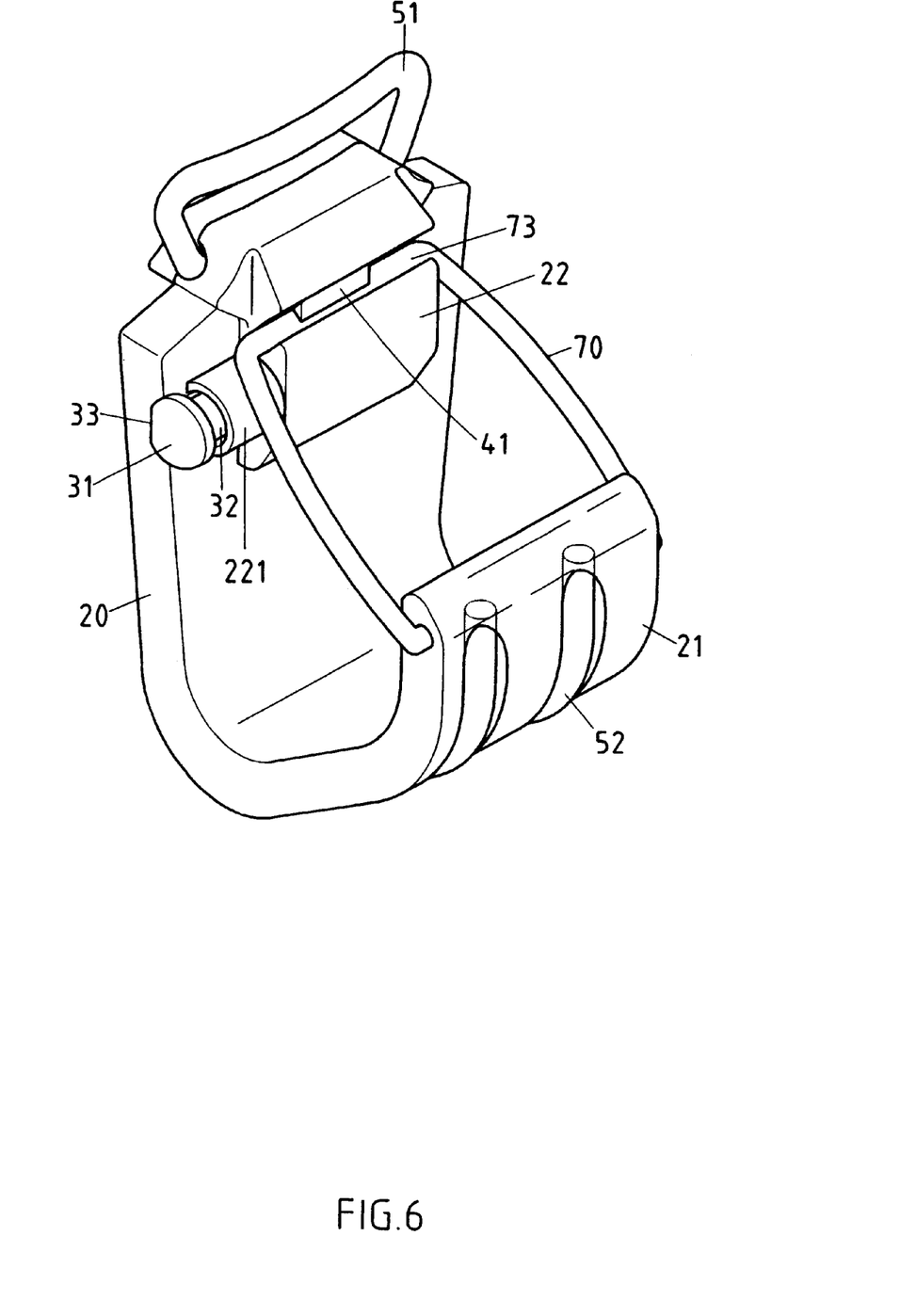
FIG. 6 shows a schematic view of the present invention in operation.
Figure 61:
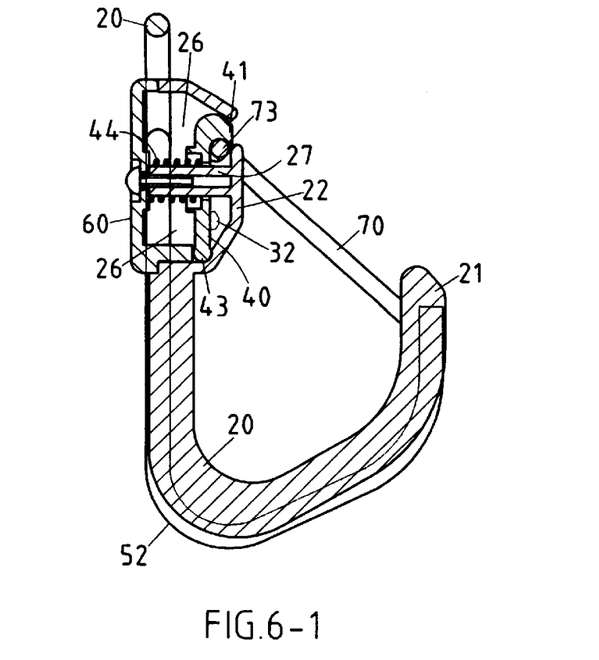
Figure 62:
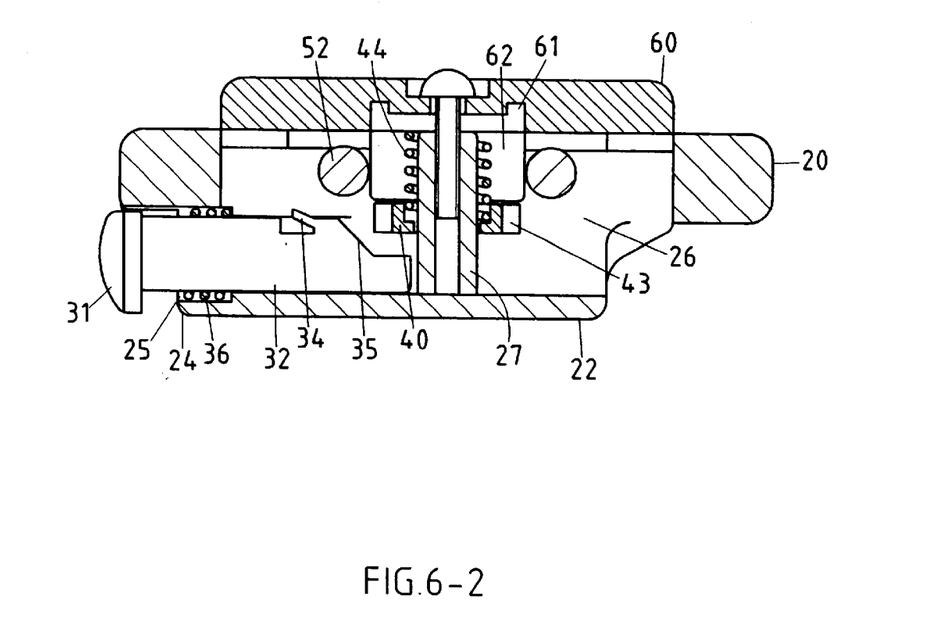
Figure 71:
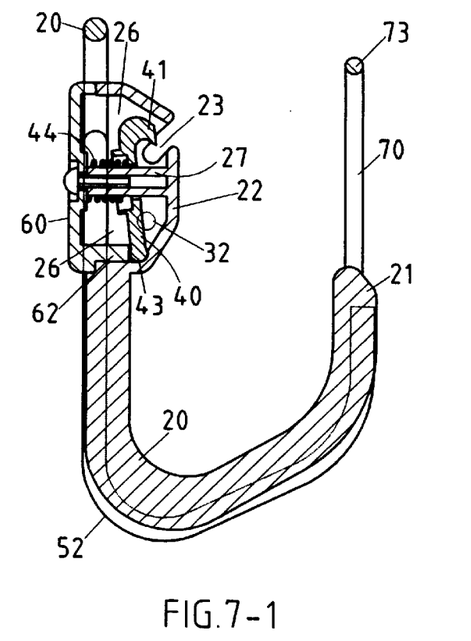
Figure 72:
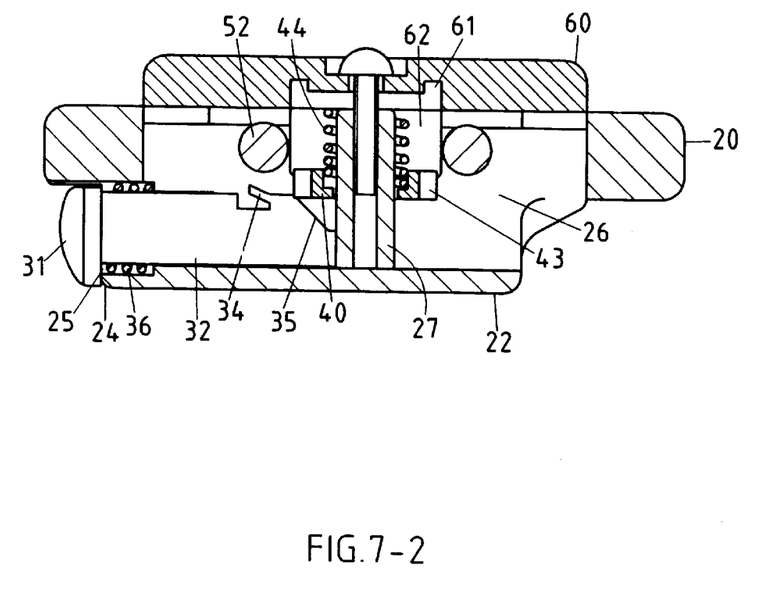

As shown in FIGS. 1 and 2, a clasping device 10 of the prior art comprises a tongue 11 and a retaining member 14. The tongue 11 is provided with a front end 13 and a connection portion 12 narrower than the front end. The retaining member 14 is provided with a retaining plate 15 having a retaining slot 16 in which the connection portion 12 of the tongue 11 is retained.

Such a prior art clasping device 10 as described above is made of a plastic material and is susceptible to deformation or severance under pressure.

SUMMARY OF THE INVENTION

The primary objective of the present invention is to provide an improved clasping device free from the drawbacks of the clasping device of the prior art described above.

In keeping with the principle of the present invention, the foregoing objective of the present invention is attained by a clasping device comprising a hooked plate, a control bolt, a retaining plate, a reinforcing hook, a cover, and a recovery spring. The hooked plate is provided at one end thereof with two retaining holes for holding both ends of the recovery spring, and at another end thereof with a retaining seat having a retaining slot for retaining the crown portion of the recovery spring.

The objective, features and functions of the present invention will be more readily understood upon a thoughtful deliberation of the following detailed description of the present invention with reference to the accompanying drawings.

BRIEF DESCRIPTION OF THE DRAWINGS

FIG. 6-1 shows a sectional schematic view of the present invention at work.

FIG. 6-2 shows another sectional schematic view of the present invention in operation.

FIG. 7-1 shows a sectional schematic view of the present invention in an unfastening state.

FIG. 7-2 shows another sectional schematic view of the present invention in an unfastening state.

DETAILED DESCRIPTION OF THE INVENTION

As shown in all drawings provided herewith, a clasping device embodied in the present invention comprises a hooked plate 20, a control bolt 30, a retaining plate 40, a reinforcing hook 50, a cover 60, and a recovery spring 70.

The hook plate 20 is provided at one end thereof with a retaining portion 21, and at another end thereof with a retaining seat 22. The retaining portion 21 has two pivoting holes 211 and 212, and two insertion holes 29. The retaining seat 22 has a retaining slot 23 which is provided with a through hole 24. The retaining seat 22 is provided with a cross tube 221 having a cross through hole 25, and a cell or cavity 26 having a pillar 27 and a retaining hole 28 in communication with the cross through hole 25. The cell 26 further has a cross slot 261. The hook plate 20 is provided in the back side thereof with two guide slots 201.

The control bolt 30 has a head 31 greater in diameter than the cross tube 221 of the retaining seat 22, and a shank 32 having an inverted hook 34 and a slanted guide surface 35. The shank 32 is provided with a spring 36 fitted thereover and is received in the cross through hole 25.

The retaining plate 40 is provided with a hooked body 41, a through hole 42, and a cross shaft 43. The retaining plate 40 is received in the cell 26 of the retaining seat 22 of the hook plate 20 such that the pillar 27 of the cell 26 is received in the through hole 42 of the retaining plate 40, and that the hooked body 41 of the retaining plate 40 is located in the retaining slot 23 of the retaining seat 22 of the hook plate 20, and further that the cross shaft 43 of the retaining plate 40 is received in the cross slot 261 of the cell 26 of the retaining seat 22 of the hook plate 26. The receiving plate 40 is further provided with a spring 44 which is fitted over the pillar 27 of the cell 26 via the through hole 42 of the retaining plate 40.

The reinforcing hook 50 is made of a metal material and is provided with a circular body 51 having two bracing rods 52 extending therefrom. The bracing rods 52 are located in the two guide slots 201 of the hook plate 20 via the two insertion holes 29 of the retaining portion 21 of the hook plate 20.

The cover 60 is provided in an inner side thereof with a receiving slot 61 for receiving the retaining plate 40. The cover 60 is further provided with a press plate 62. The cover 60 seals off the cross slot 261 of the hook plate 20 such that the press plate 62 of the cover 60 presses against the two bracing rods 51 of the reinforcing hook 50 and the spring 44 of the retaining plate 40. The cover 60 is fastened by a screw 63 which is engaged with the pillar 27 of the cell 26 of the retaining seat 22 of the hook plate 20 such that the inner side of the cover 60 is kept apart from the retaining plate 40, and that the press plate 62 presses against the cross shaft 43 of the retaining plate 40.

The recovery spring 70 is of a U-shaped construction and is provided with two arms 71 and 72, and a crown portion 73. The free ends of the two arms 71 and 72 are received in the two pivoting holes 211 and 212 of the retaining portion 21 of the hook plate 20. The two arms 71 and 72 can be turned such that the crown portion 73 of the recovery spring 70 is received in the retaining slot 23 of the hook plate 20, and that the crown portion 73 is located by the hooked body 41 of the retaining plate 40. When the control bolt 30 is pressed to displace inward such that the slanted guide surface 35 of the shank 32 of the control bolt 30 pushes the top portion of the retaining plate 40 to move toward the receiving slot 61 of the cover 60, thereby resulting in the release of the crown portion 73 of the recovery spring 70 by the hooked body 41 of the retaining plate 40. As a result, an article held by the clasping device is let go.

The embodiment of the present invention described above is to be regarded in all respects as being merely illustrative and not restrictive.

What is claimed is:

1. A clasping device comprising:

a hook plate provided at one end thereof with a retaining portion, and at another end thereof with a retaining seat, said retaining portion having two pivoting holes and two insertion holes, said retaining seat having a retaining slot which is provided with a through hole, said retaining seat provided with a cross tube having a cross through hole, and a cavity having a pillar and a retaining hole in communication with said cross through hole, said cavity further having a cross slot, said hook plate further provided in a back thereof with two guide slots;

a control bolt having a head greater in diameter than said cross tube of said retaining seat, and a shank having an inverted hook and a slanted guide surface, said shank provided with a spring fitted thereover, said shank being received in said cross through hole of said retaining seat of said hook plate;

a retaining plate provided with a hooked body, a through hole, and a cross shaft, said retaining plate being received in said cavity of said retaining seat of said hook plate such that said pillar of said cavity is received in said through hole of said retaining plate, and that said hooked body of said retaining plate is located in said retaining slot of said retaining seat of said hook plate, and further that said cross shaft of said retaining plate is received in said cross slot of said cavity of said retaining seat of said hook plate, said receiving plate further provided with a spring which is fitted over said pillar of said cavity via said through hole of said retaining plate;

a reinforcing hook of a metal material and provided with a circular body having two bracing rods extending therefrom such that said bracing rods are located in said guide slots of said hook plate via said insertion holes of said retaining portion of said hook plate;

a cover provided in an inner side thereof with a receiving slot for receiving said retaining plate, said cover further provided with a press plate, said cover intended to seal off said cross slot of said hook plate such that said press plate of said cover presses against said two bracing rods of said reinforcing hook and said spring of said retaining plate, said cover being fastened by a screw which is engaged with said pillar of said cavity of said retaining seat of said hook plate such that said inner side of said cover is kept apart from said retaining plate, and that said press plate presses against said cross shaft of said retaining plate; and a recovery spring of a U-shaped construction and provided with two arms and a crown portion, said two arms being received at the free ends thereof in said two pivoting holes of said retaining portion of said hook plate, said two arms capable of being turned such that said crown portion is received in said retaining slot of said hook plate, and that said crown portion is located by said hooked body of said retaining plate, and further that said slanted guide surface of said shank of said control bolt pushes said retaining plate to move toward said receiving slot of said cover to release said crown portion of said recovery spring by said hooked body of said retaining plate at such time when said control bolt is pressed to displace.

\* \* \* \* \*